(12) United States Patent
Kim

(10) Patent No.: US 6,932,049 B2
(45) Date of Patent: Aug. 23, 2005

(54) WING STRUCTURE OF AIR SWIRLING DEVICE FOR INTERNAL COMBUSTION ENGINE

(76) Inventor: Sei Young Kim, 1564-56 Shinrion 2-Dong, Kwarak-Ku, Seoul (KR)

( * ) Notice: Subject to any disclaimer, the term of this patent is extended or adjusted under 35 U.S.C. 154(b) by 0 days.

(21) Appl. No.: 10/351,523

(22) Filed: Jan. 27, 2003

(65) Prior Publication Data

US 2003/0140892 A1 Jul. 31, 2003

(51) Int. Cl.[7] ............................................. F02M 29/06
(52) U.S. Cl. ........................................ 123/306; 123/590
(58) Field of Search ................................ 123/306, 590, 123/592, 593

(56) References Cited

U.S. PATENT DOCUMENTS 1,778,790 A * 10/1930 Brandl et al. ............... 48/189.4
6,258,144 B1 * 7/2001 Huang ......................... 55/385.3
D469,781 S * 2/2003 Kim ............................. D15/5
6,536,420 B1 * 3/2003 Cheng ......................... 123/590

* cited by examiner

*Primary Examiner*—Henry C. Yuen
*Assistant Examiner*—Hai Huynh
(74) *Attorney, Agent, or Firm*—Procopio Cory Hargreaves & Savitch, LLP

(57) ABSTRACT

Disclosed is a wing structure of air swirling device for internal combustion engine, which has a swirling device body mounted in an air cleaner, a plurality of wings mounted slantingly and radially on the swirling device body for accelerating or increasing an airflow revolution, and one or more slits formed on prescribed positions of the plurality of wings for suppressing the formation of eddy in a negative pressure zone on the rear surface of each of the plurality of wings, includes a plurality of auxiliary wings protrudedly provided to the outside with reference to the surface of each of the wings, so that the airflow collided against the surface of each of said wings go straight ahead.

4 Claims, 4 Drawing Sheets

FIG.1 (PRIOR ART)
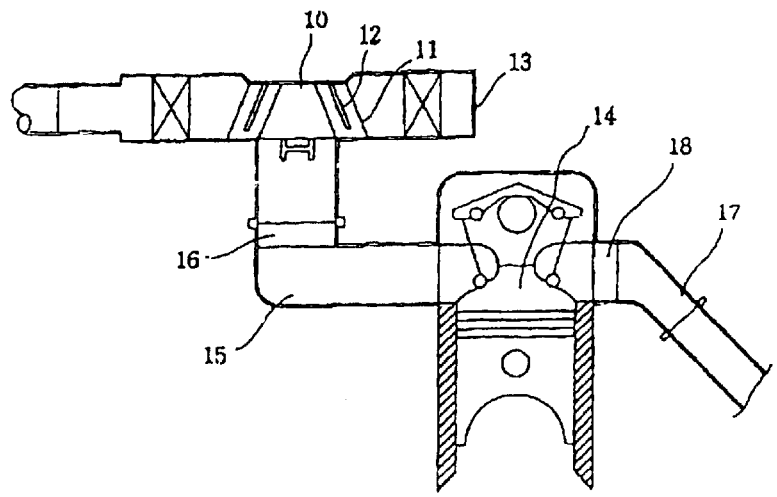
FIG.2 (PRIOR ART)
FIG.3 (PRIOR ART)
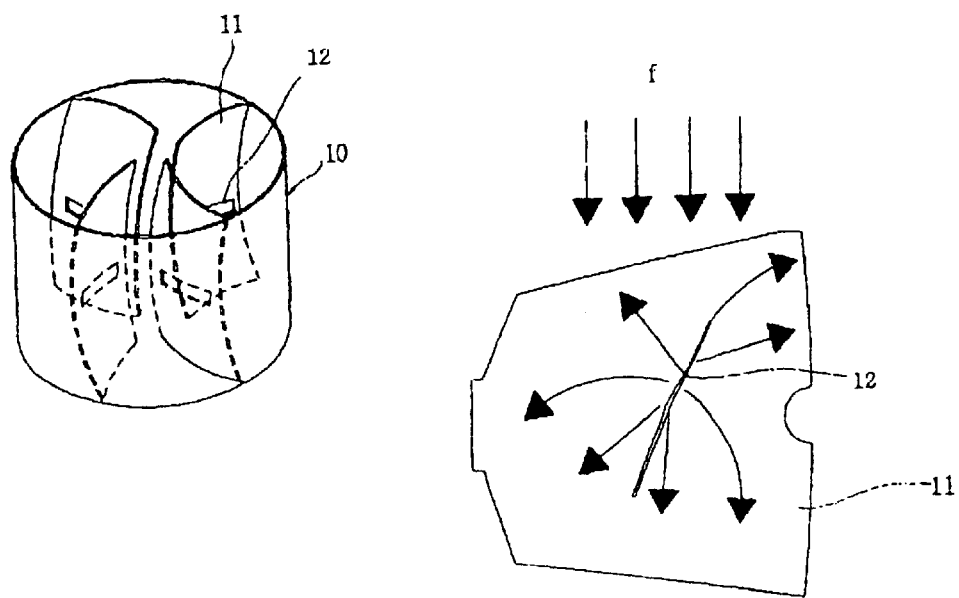

WING STRUCTURE OF AIR SWIRLING DEVICE FOR INTERNAL COMBUSTION ENGINE

This nonprovisional application claims priority under 35 U.S.C. §119(a) on patent application Ser. No. 2002-2634 filed in Korea on Jan. 28, 2002, which is herein incorporated by reference.

TECHNICAL FIELD

The present invention relates to a wing structure of an air swirling device for an internal combustion engine, and more particularly, to a wing structure of an air swirling device used in an air cleaner or an air duct of an internal combustion engine, which induces a swirl action of air filtered through an air cleaner of a spark ignition internal combustion engine of a carburetor or fuel injection type, a diesel engine, and so on. The wing structure of the swirling device introduces airflows into a combustion chamber of the engine, which is effective in reducing resistance due to negative pressure and eddy formed on the wings in the air swirling device, thereby improving processibility of the wings and increasing the amount of air flow and the speed of air flow in the combustion chamber.

BACKGROUND ART

It is known that air swirling devices of internal combustion engines and the likes can provide a large amount of air of high density to a combustion chamber of the engine by adding revolution force to airflows provided into the combustion chamber of the internal combustion engine and increasing the speed of airflow per unit time, so that combustion action of the engine is improved and engine power is increased. The prior arts have a disadvantage that air resistance generated when airflow is rotated cannot be prevented completely.

For example, Japanese patent publication Nos. 53-26247, 59-11722 and U.S. Pat. No. 4,309,969 disclose a simple turbulence device, which includes an intake valve having a large intake resistance, so that the swirling device does not create uniform airflow but create only turbulent flow.

Also, Japanese Patent Publication Nos. 60-17922 and 61-10645, and U.S. Pat. Nos. 4,424,777, 4,432,312 and 4,539,954 disclose a swirling device having wings which are disposed near an intake valve for swirling airflow.

However, such a device exhibits high friction so that the device provides a reduced amount of inlet air and thus is used only for a gasoline engine of the carburetor type.

To solve the above problems, U.S. Pat. No. 4,962,642 discloses an air swirling device having a plurality of wings positioned within an air cleaner of an internal combustion engine for swirling the airflow into the combustion chamber, so that combustion performance and engine power can be improved. However, such device has some disadvantages, such as for example, reduced output of the engine due to reduced inlet air and loss of fuel because of eddy generated at a rear surface (negative pressure zone) of the wings when the air flow is swirled.

To solve the above problems, Korean Utility Model Reg. No. 67786 issued to the inventor of this invention discloses a swirling device including an swirling device body 10 provided with a plurality of wings 11 having at least one or more generally thin, long slits 12, as shown in FIGS. 1 and 2. The swirling device body 10 is fixed and mounted in the vicinity of the center of an air cleaner 13 with bolts and nuts for swirling intake air, so that eddy generated at the negative pressure zone formed on the rear surface of the wings 11 with the slits 12 when the air enters, is prevented. As the result, air resistance is reduced and the amount of airflow is increased, so that a complete combustion is attained to improve energy efficiency and engine power.

As shown in FIG. 1, the swirling device with the slits 12 formed in the wings 11 thereof adds a revolution force to the airflow induced into a combustion chamber 14, so that the speed of airflow per unit time is increased and the density of the air flow becomes high to improve an combustion action. During an intake operation of the internal combustion engine caused by the slits 12 formed in the wings 11, the air filtered through the air cleaner 13 passes and rotates through the slits 12 formed in the wings 11 of the swirling device body 10 mounted in the air cleaner 13. The rotated airflow is swirled again by another air swirling device 16 mounted near an inlet of an intake manifold 15 and provided into the combustion chamber 14 at a high speed. The combusted exhaust gas is rapidly discharged by still another air swirling device 18 mounted near an inlet of an exhaust manifold 17;

Because the swirling device of the internal combustion engine has at least one or more slits 12 in the plurality of wings 11, eddy generation at the negative pressure zone of the rear surfaces of the wings is reduced. When the swirling device is placed in the air cleaner 13, the carbon monoxide (CO) gas level can be reduced up to about 17% at engine idle speed, the engine power can be increased up to about 11%, fuel economy can be improved to about 6%, and knocking of the engine can be reduced up to about 5%.

Therefore, the swirling device of the internal combustion engine having the slits 12 in the wings 11 adds the revolution force to the airflow induced into the combustion chamber, so that the speed of air flow per unit time is increased and combustion action, due to the increased density, is improved. Furthermore, in the swirling device of the internal combustion engine, eddy generation at the negative pressure zone by the slits 12 formed in the wings 11 is prevented, and thereby, the airflow resistance is reduced and the amount of airflow is increased, so that a sufficient amount of accelerated air is provided into the engine to increase its combustion efficiency and engine power.

However, the slits 12 formed in the wings 11 of the conventional swirling device of the internal combustion engine are not ideal in reducing eddy, because of being formed by cutting portions of the flat sheet type wings 11 to have a generally thin and long shape. According to such circumstances, the conventional swirling device of the internal combustion engine having the slits 12 formed in the wings 11 cannot cope with more controlled airflow.

For example, the conventional swirling device of the internal combustion engine having the slits 12 formed in the wings 11 increases the speed of airflow per unit time and raises density of air by adding revolution force to the airflow induced into the combustion chamber, so that the combustion action and the engine power are improved. However, only a swirling device cannot control airflow conditions because a supercharging of the air by the swirling device may occur.

Moreover, in the conventional swirling device, the thin and long rectangular slits 12 are not made uniformly, and in case where the slits 12 are cut in a length direction, there is a possibility that the wings 11 may be deformed, which makes the air flows substantially decelerated.

Additionally, because the shape of the wings for preventing eddy generation at the negative pressure zone by forming the slits 12 in the wings 11, induces linear type of airflow due to their flat upper and lower sides, it is difficult to maintain a stably and uniformly mixed level of the air and fuel particles and to secure a sufficient amount of airflow.

FIG. 3 shows the air dispersion on the surface of the wing 11 with the slit 12. In other words, the airflow loses their direct streams and as soon as they are against the surface of the wing 11, they are dispersed in every direction. Generally, the dispersed airflow on the surface of the swirling wing 11 make the speed of airflow substantially decreased, which results in the decrease of the amount of airflow. This means that the object of the installation of the wings for increasing the amount of airflow is not achieved. This also accompanies the deterioration of the engine performance, the low efficiency of energy, the serious air pollution and so on. It is therefore appreciated that the conventional swirling device having the wings 11 each provided with the slit 12 fails to sufficiently compensate for the amount of air flow.

Until now, the eddy effect from the internal combustion engine has been emphasized, but the conventional swirling devices has a problem that as the airflow are against the wings and dispersed in every direction, it is difficult to maintain the airflow in a smooth manner.

DISCLOSURE OF INVENTION

Accordingly, the present invention is directed to a wing structure of an air swirling device for an internal combustion engine that substantially obviates one or more problems due to limitations and disadvantages of the related art.

An object of the present invention is to provide a wing structure of an air swirling device for an internal combustion engine, which can increase the speed of airflow per unit time and raise density of air by adding revolution force to the airflow induced into the combustion chamber, so that the combustion action and the engine power are improved.

Another object of the present invention is to provide a wing structure of an air swirling device for internal combustion engine, which can reduce deformation of wings of the swirling device and improve processibility for the purpose of improving the combustion action and the engine power by increasing the speed of airflow per unit time and raising density of air by adding revolution force to the airflow induced into the combustion chamber of the internal combustion engine.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to a first aspect of the present invention, as embodied and broadly described herein, a wing structure of an air swirling device for internal combustion engine, which has a swirling device body mounted in an air cleaner of the engine, a plurality of wings mounted slantingly and radially on the swirling device body for accelerating or increasing an airflow revolution, and one or more slits formed on prescribed positions of the, plurality of wings for suppressing the formation of eddy in a negative pressure zone on the rear surface of each of the plurality of wings, includes a plurality of auxiliary wings protrudedly provided to the outside with reference to the surface of each of the wings, so that the airflow collided against the surface of each of said wings go straight ahead.

According to a second aspect of the present invention, as embodied and broadly described herein, a wing structure of air swirling device for internal combustion engine, which has a swirling device body mounted in an air cleaner, a plurality of wings mounted slantingly and radially on the air swirling device body for accelerating or increasing an airflow revolution, and one or more slits formed on prescribed positions of the plurality of wings for suppressing the formation of eddy in a negative pressure zone on the rear surface of each of the plurality of wings, includes one or more airflow holes formed at prescribed positions for reducing air flow resistance due to eddy generated at a negative pressure zone of each of the wings, and a plurality of auxiliary wings protrudedly provided to the outside with reference to the surface of each of the wings, so that the airflow collided against the surface of each of said wings go straight ahead.

With the auxiliary wings provided on the wings of the air swirling device for the internal combustion engine, the airflow collided against the surface of each of said wings go straight ahead. Thereby, the speed of airflow is increased and the amount of airflow is thus increased. This removes the problems as encountered conventionally. That is, the performance of the internal combustion engine is enhanced, the energy efficiency is improved, and the degree of air pollution is reduced.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which:

FIG. 1 is a schematic view of a conventional air swirling device of an internal combustion engine;

FIG. 2 is a view of the shape of wings of FIG 1;

FIG. 3 is a view showing a stream of air flows against the surface of the FIG 1;

BEST MODE FOR CARRYING OUT THE INVENTION

Reference will now be made in detail to the preferred embodiments of the present invention, examples of which are illustrated in the accompanying drawings.

Figure 4:
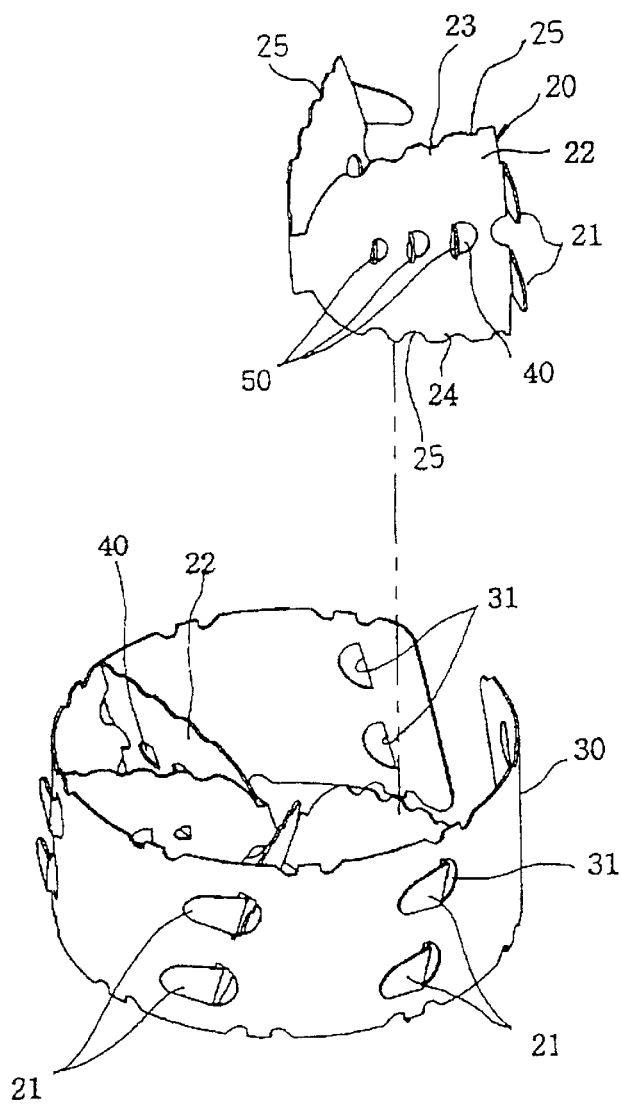
FIG. 4 is a perspective view of a wing structure of an air swirling device for an internal combustion engine according to a first embodiment of the present invention.
Figure 5:
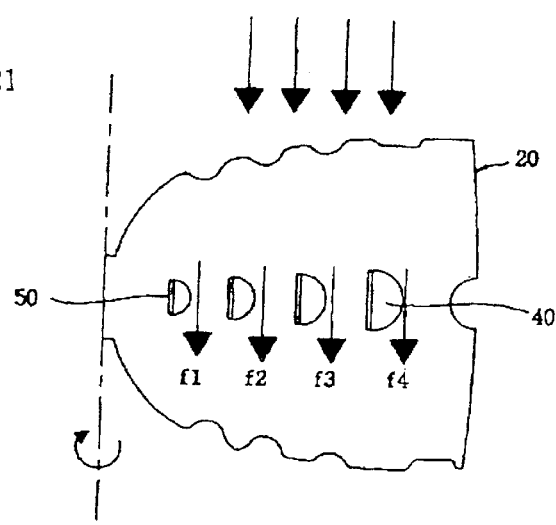
FIG. 5 is a schematic view of the auxiliary wings of the wing structure of the present invention.

FIGS. 4 to 8 show various examples of wings of an air swirling device of an internal combustion engine according to the present invention. FIG. 4 is a perspective view of a wing structure of an air swirling device for an internal combustion engine according to a first embodiment of the present invention, and FIG. 5 is a schematic view of the auxiliary wings of the wing structure of the present invention. FIGS. 6a and 6b are views of a wing structure of an air swirling device for an internal combustion engine according to a second embodiment of the present invention, FIGS. 7a to 7c are views of examples showing various arrangements of the auxiliary wings of the wing structure of the present invention, and FIGS. 8a to 8c are views of examples showing various geometrical surface shapes of each auxiliary wing of the wing structure of the present invention.

A plurality of the wings 20 of the air swirling device of the internal combustion engine according to the present invention, as shown in FIG. 4, are mounted slantingly and radially on the swirling device body 30 so as to accelerate and increase air revolution. Each of the wings 20 has one or more airflow holes 40 formed at prescribed positions thereof for preventing the generation of eddy at a negative pressure zone of a rear surface thereof, or has one or more thin and long slits.

Furthermore, the wing 20 has wave surfaces 25 at the upper side 23 and the lower side 24 thereof for inducing non-linear type airflow, so that mixing of the air and fuel particles is accelerated.

Figure 7A:
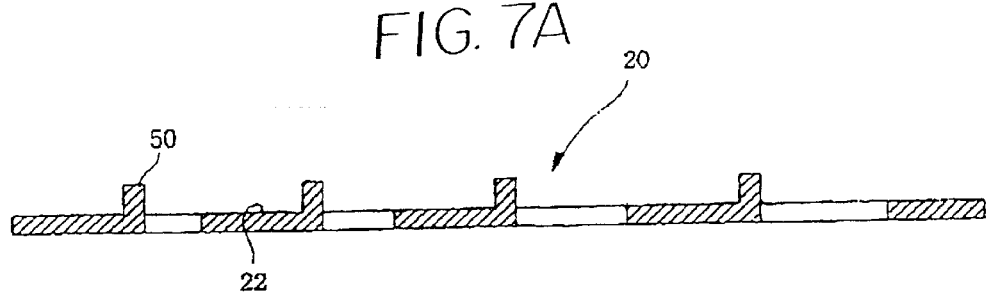
FIGS. 7a to 7c are views of examples showing various arrangements of the auxiliary wings of the wing structure of the present invention.
Figure 7B:
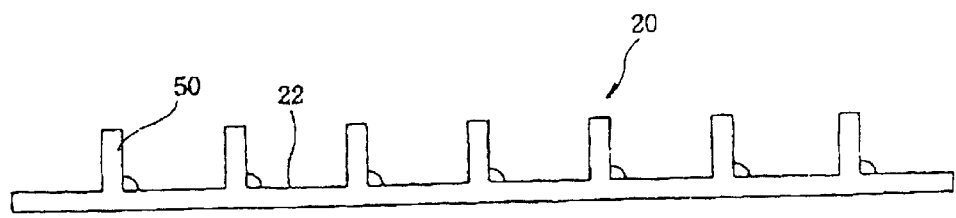
Figure 7C:
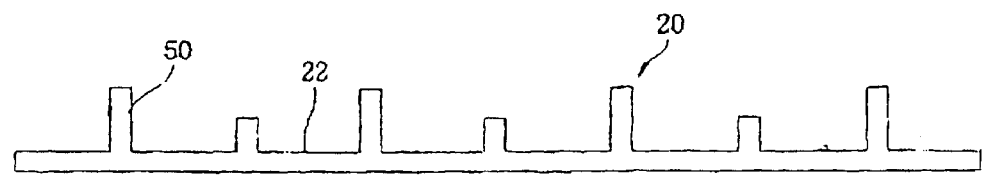
Figure 8A:
FIGS. 8a to 8c are views of examples showing various geometrical surface shapes of each auxiliary wing of the wing structure of the present invention.
Figure 8B:
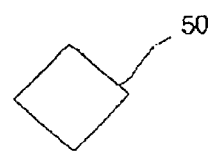
Figure 8C:
Figure 8D:
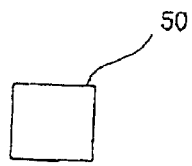

The plurality of wings 20 each has a plurality of auxiliary wings 50 that are formed protruded on the surface thereof, as shown in FIG. 5. The arrangement of the plurality of wings 50 is carried out in such various ways as shown in FIGS. 7a to 7c, and the shape of each wing 50 is taken in such various manners as shown in FIGS. 8a to 8d.

In the above drawings, reference numeral 21 indicates protrusions. 21 formed on each of the wings, 22 indicates the surface of each of the wings, and 31 indicates through holes formed in the swirling device body into which the protrusions 21 of each of the wings are inserted for coupling with each of the wings.

FIG. 5 shows the auxiliary wings 50 formed on the surface 22 of each of the wings 20 according to the present invention.

The wings 50 are formed on the surface of each of the wings 20, so that the airflow collided against the surface of the wing go straight ahead. As shown in FIG. 5, in other words, if it is assumed that prescribed airflow is in an f direction, they gather to given areas, i.e. f1 to f4, and move straight ahead, depending upon the arranged positions of the auxiliary wings 50 and their shape. The conventional wing structure is made in such a fashion that since the surface of each wing is generally formed into a flat plate, the airflow that is collided against the surface of the wing is dispersed in every direction. To the contrary, the wings 50 of the present invention, which are provided on the surface of each wing, serve to make the airflow being in contact with the surface of each wing moved straight ahead, so that the collision of airflow against the surface of wing is released and the speed of airflow is increased, thereby enabling the amount of airflow to be sufficiently supplied to the engine.

Figure 6A:
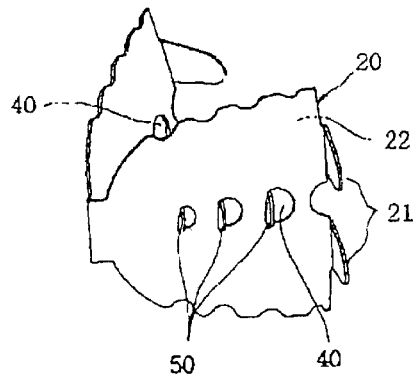
FIGS. 6a and 6b are views of a wing structure of an air swirling device for an internal combustion engine according to a second embodiment of the present invention.
Figure 6B:
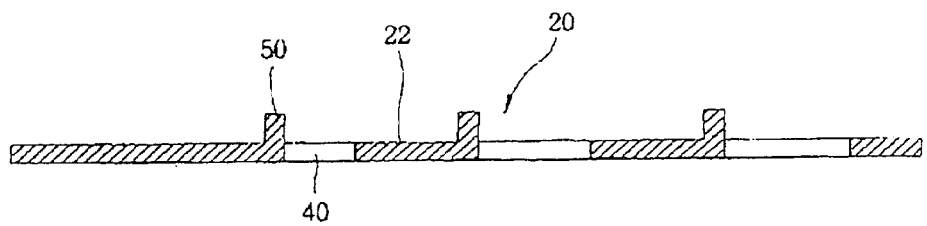

FIGS. 6a and 6b show the wing structure of an air swirling device for an internal combustion engine according to a second embodiment of the present invention. In this embodiment, the auxiliary wings 50 are formed relative to the airflow holes 40. However, it is not restricted to this structure. In case of forming the holes 40 on each wing 20, the structure for disposing them is more advantageous than other structures for preventing the generation of eddy on each wing and also makes the formation of the wings 50 carried out in a simple way with a press working. In the same manner as shown in FIG. 5, the airflow goes straight ahead on the surface of each wing with the help of the wings 50 thereon.

In more detail, in the process of forming the holes 40 on the wing 20, as shown in FIG. 6a, the part of each hole is not cut to be bent with a result that the bent part acts as the wing 50. FIG. 6b shows the sectional view of the wing with the holes 40 thereon. This structure removes the process where the wings 50 should be welded or worked.

FIGS. 7a to 7c show the examples for various arrangements of the auxiliary wings 50 of the wing structure of the present invention. FIG. 7a shows the arrangement of the wings 50, where they are formed in the press working during the formation of the holes 40 on each wing 20. FIG. 7b shows the arrangement of the wings 50, where they are welded on the surface 22 of each wing 20, independently of the wing 20. FIG. 7c shows the arrangement of the wings 50, where the wings 50 are formed asymmetrically in height. The arrangements of the wings 50 are appropriately designed by selecting their heights, positions and shapes with reference to the airflow.

FIGS. 8a to 8d show the examples of the various shapes of each auxiliary wing 50 that are applicable to this invention. Of course, the shapes of the wings 50 are selected appropriately with reference to the characteristics of the airflows on the wings. In this case, it is noted that if the wings 50 having any shape are formed in such a manner as to be protruded on the surface of the wing, they still allow the airflow on the wing to go straight ahead.

The wings 20 of the air swirling device of the internal combustion engine having the airflow holes 40 and the wave surfaces 25 can achieve the characteristics obtained by wings of existing air swirling devices. That is, the wings of the air swirling device according to the present invention can increase the speed of airflows per unit time and raise air density by increasing revolution force to the airflow induced into the combustion chamber of the internal engine, so that the combustion action of the engine and engine power are improved.

The plurality of the holes 40 has various sizes, but the complete combustion and output performance cannot be obtained only by selection of the arrangement and shape of the holes. The complete combustion and output performance depend on conditions of the engine side. Both of the slits 12 of the prior art and the holes 40 of the present invention cannot achieve the complete combustion and output performance only by a difference of their shapes.

When the airflow holes 40 are formed in the surfaces 22 of the wings 20 for preventing the generation of eddy at the negative pressure zone, the more systematic design can be achieved. That is, the air swirling device can be designed suitable for the engine by arrangement and size of the holes 40 accordant to the engine condition. Therefore, the present invention can design the air swirling device to be suitable for the engine condition.

Additionally, the holes 40 can be press-finished in various arrangements and sizes in a relatively narrow area of the wing 20.

If not cut surfaces slits but circular airflow holes 40 are formed in the surfaces of the sheet type wings 20, self internal power is generated because there is no distortion and the circular airflow holes 40 is smaller in deformation after the press finishing than rectangular holes.

Meanwhile, the wave surfaces 25 formed along a longitudinal direction of portions, i.e. the upper side 23 and the lower side 24, excepting sides being in contact with the swirling device body 30 when the wings 20 are mounted on the swirling device body 30, can change in wave form the airflow which collide along the outermost walls of the wings 20 when the wings 20 are rotated, thereby giving a high advantage to the movement of the airflow.

The airflow with the waveforms provides an indirect stirring effect when the air is mixed with other fuel particles, so that the mixed level of the air and the fuel particles is good.

Each of the wings 20 of the present invention is formed of metal, nonferrous metal, or nonmetal.

The present invention is provided with the auxiliary wings 50 that are protruded on each of the wings 20, irrespective of the characteristics or specifications of the wings 20 of the air swirling device, so that the airflow colliding against the surface of each wing during the operation of the engine go straight ahead, which allows the collision of the airflow against the surface of the wing to be released or prevented and prevents the dispersion of airflow on the surface of the wing. This results in the increase of the speed of airflow and the amount of airflow.

As described above, the wing structure of the air swirling device of the internal combustion engine according to the present invention can be provided with the auxiliary wings, so that the airflows colliding against the surface of each wing go straight ahead to enable the collision of the airflow against the surface of the wing to be released or prevented and increase the speed of airflow and the amount of airflow. This achieves the enhancement of energy efficiency, the improvement of engine performance, and the reduction of the degree of air pollution.

Industrial Applicability

As described above, the wing structure of the air swirling device of the internal combustion engine according to the present invention can be provided with the auxiliary wings, so that the airflows colliding against the surface of each wing go straight ahead to enable the collision of the airflow against the surface of the wing to be released or prevented and increase the speed of airflow and the amount of airflow. This achieves the enhancement of energy efficiency, the improvement of engine performance, and the reduction of the degree of air pollution.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wing structure of air swirling device for internal combustion engine, which has a swirling device body mounted in the air flow system of the engine, a plurality of wings mounted slantingly and radially on said swirling device body for accelerating or increasing an airflow revolution, and one or more slits formed on prescribed positions of said plurality of wings for suppressing the formation of eddy in a negative pressure zone on the rear surface of each of said plurality of wings, said wing structure comprising:

a plurality of auxiliary wings protrudedly provided to the outside with reference to the surface of each of said plurality of wings, so that the airflow collided against the surface of each of said plurality of wings goes straight ahead.

2. The wing structure according to claim 1, wherein said plurality of auxiliary wings is formed irregularly in height on the surface of each of said plurality of wings.

3. A wing structure of air swirling device for internal combustion engine, which has a swirling device body mounted in the air flow system of the engine, a plurality of wings mounted slantingly and radially on said swirling device body for accelerating or increasing an airflow revolution, and one or more slits formed on prescribed positions of said plurality of wings for suppressing the formation of eddy in a negative pressure zone on the rear surface of each of said plurality of wings, said wing structure comprising:

one or more airflow holes formed at prescribed positions for reducing airflow resistance due to eddy generated at a negative pressure zone of each of said plurality of wings; and a plurality of auxiliary wings protrudedly provided to the outside with reference to the surface of each of said plurality of wings, so that the airflow collided against the surface of each of said wings go straight ahead.

4. The wing structure according to claim 3, wherein each of said plurality of auxiliary wings is bent in an integral form on the one end of each of said airflow holes in such a manner as to be protruded on the surface of each of said plurality of wings.

\* \* \* \* \*